US012023715B2

(12) United States Patent
Miyamoto

(10) Patent No.: US 12,023,715 B2
(45) Date of Patent: Jul. 2, 2024

(54) OPTICAL SORTER

(71) Applicant: SATAKE CORPORATION, Tokyo (JP)

(72) Inventor: Tomoyuki Miyamoto, Tokyo (JP)

(73) Assignee: SATAKE CORPORATION, Tokyo (JP)

( * ) Notice: Subject to any disclaimer, the term of this patent is extended or adjusted under 35 U.S.C. 154(b) by 267 days.

(21) Appl. No.: 17/781,793

(22) PCT Filed: Dec. 1, 2020

(86) PCT No.: PCT/JP2020/044635
§ 371 (c)(1),
(2) Date: Jun. 2, 2022

(87) PCT Pub. No.: WO2021/117544
PCT Pub. Date: Jun. 17, 2021

(65) Prior Publication Data
US 2023/0009210 A1 Jan. 12, 2023

(30) Foreign Application Priority Data

Dec. 12, 2019 (JP) ................................. 2019-224775

(51) Int. Cl.
B07C 5/34 (2006.01)
B07C 5/342 (2006.01)
G01N 21/85 (2006.01)

(52) U.S. Cl.
CPC ........... B07C 5/3425 (2013.01); G01N 21/85 (2013.01); G01N 2021/8592 (2013.01); G01N 2201/061 (2013.01)

(58) Field of Classification Search
CPC .................. B07C 5/3425; B07C 5/366; B07C 2501/0018; G01N 21/85; G01N 2021/8592; G01N 2201/061
See application file for complete search history.

(56) References Cited

U.S. PATENT DOCUMENTS

2009/0079970 A1* 3/2009 Cohn ................. G01N 21/8806
356/237.1
2011/0025838 A1 2/2011 Ninomiya
(Continued)

FOREIGN PATENT DOCUMENTS

CN 103917305 A 7/2014
GB 2492359 A 1/2013
(Continued)

OTHER PUBLICATIONS

Extended European Search Report corresponding to European Application No. 20899318.8, mailed Dec. 22, 2022.
(Continued)

Primary Examiner — Dominic J Bologna
Assistant Examiner — Mohamed Doumbia
(74) Attorney, Agent, or Firm — Renner, Otto, Boisselle & Sklar, LLP

(57) ABSTRACT

An optical sorter includes an intermittent light source configured to intermittently emit light toward a plurality of sorting targets in transit, an optical sensor configured to detect the light associated with one sorting target among the plurality of sorting targets in transit during a plurality of intermittent light scan periods, a determination part configured to determine a foreign object and/or a defective product with respect to the one sorting target based on a signal acquired by the optical sensor, and a light source control part configured to control the intermittent light source. The light source control part is configured to control the intermittent light source in such a manner that, in a case where the intermittent light source is turned on during at least one intermittent light scan period among the plurality of intermittent light scan periods, a lighting period during which the intermittent light source is on and a non-lighting period during which the intermittent light source is off are provided (Continued)

and the lighting period is started at a timing delayed behind a start of the at least one intermittent light scan period in each of the at least one intermittent light scan period.

11 Claims, 9 Drawing Sheets

(56) References Cited

U.S. PATENT DOCUMENTS

| | | | |
|---|---|---|---|
| 2014/0226163 A1* | 8/2014 | Hug | G01N 21/85 356/445 |
| 2017/0350825 A1 | 12/2017 | Ishizuki et al. | |
| 2018/0056334 A1* | 3/2018 | Justice | B07C 5/3425 |

FOREIGN PATENT DOCUMENTS

| | | | |
|---|---|---|---|
| JP | 2008-302314 A | | 12/2008 |
| JP | 2009-240876 A | | 10/2009 |
| JP | 2011-33449 A | | 2/2011 |
| JP | 2014-520662 A | | 8/2014 |
| JP | 2014520662 A | * | 8/2014 |
| JP | 2016-118455 A | | 6/2016 |
| JP | 2017-026624 A | | 2/2017 |
| JP | 2017-219425 A | | 12/2017 |
| WO | 2013/001304 A | | 1/2013 |

OTHER PUBLICATIONS

Chinese Office Action for corresponding Application No. CN 202080085832.1, issued Mar. 1, 2024, with English translation.
International Search Report corresponding to International Application No. PCT/JP2020/044635 mailed Feb. 16, 2021, in English.
Written Opinion corresponding to International Application No. PCT/JP2020/044635 mailed Feb. 16, 2021, Japanese only.
Office Action corresponding to Japanese Patent Application No. 2019-224775 mailed Mar. 7, 2022, with English translation.
International Preliminary Report on Patentability corresponding to International Application No. PCT/JP2020/044635, mailed May 17, 2022 with English translation.

* cited by examiner

OPTICAL SORTER

This application is a national phase of International Application No. PCT/JP2020/044635 filed Dec. 1, 2020, which claims the priority of Japanese Patent Application JP 2019-224775 filed Dec. 12, 2019, both of which are hereby incorporated herein by reference in their entireties.

TECHNICAL FIELD

The present invention relates to an optical sorter.

BACKGROUND

Conventionally, there have been known optical sorting apparatuses that distinguish and remove a foreign object and a defective product contained in sorting targets using optical information acquired by an optical sensor when the sorting targets are irradiated with light (for example, the following patent literature, PTL 1).

CITATION LIST

[PTL 1] Japanese Patent Application Public Disclosure No. 2009-240876

SUMMARY

Technical Problem

However, this type of optical sorting apparatus leaves room for improvement. For example, the optical sorting apparatus discussed in PTL 1 can increase the accuracy of distinguishing a cracked grain with respect to a rice grain, but leaves room for improvement to increase the accuracy of distinguishing another type of defective grain (for example, a milky grain, a green immature grain, and a colored grain) with respect to brown rice or milled rice or to increase the distinguishing accuracy when a granular object other than the brown rice and the milled rice (for example, unhulled rice, another kind of kernel (a wheat grain and the like), beans (a soybean, a chickpea, a green soybean, and the like), resin (a pellet and the like), a rubber piece, and the like) is processed as a target to be sorted.

Solution to Problem

The present invention has been made with the aim of solving the above-described problem, and can be realized as, for example, the following aspects.

According to a first aspect of the present invention, an optical sorter is provided. This optical sorter includes an intermittent light source configured to intermittently emit light toward a plurality of sorting targets in transit, an optical sensor configured to detect the light associated with one sorting target among the plurality of sorting targets in transit during a plurality of intermittent light scan periods, a determination part configured to determine a foreign object and/or a defective product with respect to the one sorting target based on a signal acquired by the optical sensor, and a light source control part configured to control the intermittent light source. The light source control part is configured to control the intermittent light source in such a manner that, in a case where the intermittent light source is turned on during at least one intermittent light scan period among the plurality of intermittent light scan periods, a lighting period during which the intermittent light source is on and a non-lighting period during which the intermittent light source is off are provided and the lighting period is started at a timing delayed behind a start of the at least one intermittent light scan period in each of the at least one intermittent light scan period.

According to the optical sorter configured in this manner, the intermittent light source is off at the timing of the start of the at least one intermittent light scan period. Therefore, the light emitted from the intermittent light source during some intermittent light scan period is not detected during an intermittent light scan period immediately preceding thereto. For example, supposing that there are a first intermittent light scan period and a second intermittent light scan period subsequent to the first intermittent light scan period, if the intermittent light source is switched from an off-state to an on-state at the same time as the start of the second intermittent light scan period (i.e., the end of the first intermittent light scan period), the light emitted at the same time as the start of the second intermittent light scan period might be mixed in the result of the detection in the first intermittent light scan period as noise. On the other hand, according to the present aspect, such a phenomenon can be prevented and therefore the accuracy of the determination by the determination part can be increased.

According to a second aspect of the present invention, in the first aspect, the light source control part is configured to control the intermittent light source in such a manner that the lighting period is ended at a timing earlier than an end of the at least one intermittent light scan period. According to this aspect, the intermittent light source is off at the timing of the end of the at least one intermittent light scan period. Therefore, the light emitted from the intermittent light source during some intermittent light scan period is not detected during an intermittent light scan period immediately subsequent thereto. For example, supposing that there are a first intermittent light scan period and a second intermittent light scan period subsequent to the first intermittent light scan period, if the intermittent light source is switched from an on-state to an off-state at the same time as the end of the first intermittent light scan period (i.e., the start of the second intermittent light scan period), the light emitted at the same time as the end of the first intermittent light scan period might be mixed in the result of the detection in the second intermittent light scan period as noise. On the other hand, according to the present aspect, such a phenomenon can be prevented and therefore the accuracy of the determination by the determination part can be increased.

According to a third aspect of the present invention, in the first or second aspect, the intermittent light source includes a first intermittent light source disposed on a first side with respect to a transit route of the plurality of sorting targets and configured to emit first light, and a second intermittent light source disposed on a second side opposite from the first side and configured to emit second light having the same wavelength as the first light. The optical sensor includes a first optical sensor disposed on the first side and a second optical sensor disposed on the second side. The plurality of intermittent light scan periods includes a first intermittent light scan period and a second intermittent light scan period. The light source control part is configured to control the first intermittent light source and the second intermittent light source in such a manner that the first intermittent light source is turned on and the second intermittent light source is off during the first intermittent light scan period, and the first intermittent light source is off and the second intermittent light source is turned on during the second intermittent light scan period. According to this aspect, the first optical sensor on the first side detects the reflected light based on the first light (the light reflected by the sorting target) and the second optical sensor on the second side detects the transmitted light based on the first light (the light transmitted through the sorting target) during the first intermittent light scan period. The first optical sensor on the first side detects the transmitted light based on the second light and the second optical sensor on the second side detects the reflected light based on the second light during the second intermittent light scan period. Therefore, the determination part can determine the foreign object and/or the defective product based on transmitted images (images expressed by the transmitted light) and reflected images (images expressed by the reflected light) on the both sides of the sorting target (i.e., the first side and the second side). Therefore, the accuracy of the determination by the determination part can be increased compared to when the determination is made based on the transmitted image and reflected image on one side of the sorting target. For example, even when a defective portion is present only on one side of the sorting target (i.e., one of the first side and the second side), the determination part can accurately determine the foreign object and/or the defective product.

According to a fourth aspect of the present invention, in the third aspect, the first light and the second light are red light. According to this aspect, the determination part can accurately determine the foreign object and/or the defective product based on the red transmitted light and the red reflected light. For example, in a case where the sorting target is rice, the determination part can accurately distinguish a milky grain.

According to a fifth aspect of the present invention, in the third or fourth aspect, the intermittent light source includes a third intermittent light source disposed on the first side and configured to emit third light having a wavelength different from the first light, and a fourth intermittent light source disposed on the second side and configured to emit fourth light having the same wavelength as the third light. The light source control part is configured to control the third intermittent light source and the fourth intermittent light source in such a manner that the third intermittent light source and the fourth intermittent light source are turned on during both the first intermittent light scan period and the second intermittent light scan period. According to this aspect, the first optical sensor detects the reflected light based on the third light and the transmitted light based on the fourth light together and the second optical sensor detects the transmitted light based on the third light and the reflected light based on the fourth light together during both the first intermittent light scan period and the second intermittent light scan period. Therefore, the determination part can determine the foreign object and/or the defective product based on reflected and transmitted images (images expressed by light acquired by combining the reflected light and the transmitted light) based on the third light and the fourth light on the both sides of the sorting target. Therefore, the determination part can distinguish a larger number of kinds of foreign objects and/or defective products. In addition, each of the third intermittent light source and the fourth intermittent light source is turned on during both the first intermittent light scan period and the second intermittent light scan period, and therefore the resolutions do not reduce with respect to the reflected and transmitted images.

According to a sixth aspect of the present invention, in the fifth aspect, each of the third light and the fourth light includes green light and blue light. According to this aspect, the determination part can determine the foreign object and/or the defective product based on green and blue reflected and transmitted images. For example, in the case where the sorting target is rice, the determination part can accurately distinguish a colored grain.

According to a seventh aspect of the present invention, in the first or second aspect, the intermittent light source emits invisible light having a wavelength in an invisible wavelength region as the light. The optical sensor is configured as an invisible light optical sensor that detects the invisible light. The optical sorter further includes a visible light source configured to emit visible light having a wavelength in a visible wavelength region toward the plurality of sorting targets in transit, and a visible light optical sensor configured to detect the visible light associated with the one sorting target during a plurality of visible light scan periods. The determination part is configured to determine the foreign object and/or the defective product based on a signal acquired by the invisible light optical sensor and a signal acquired by the visible light optical sensor. The intermittent light scan period and the visible light scan period are defined based on times having different lengths from each other, respectively. According to this aspect, the scan period suitable to detect the invisible light and the scan period suitable to detect the visible light can be individually set. For example, in a case where the invisible light is near-infrared light, generally, an optical sensor has lower light receiving sensitivity to near-infrared light than the light receiving sensitivity to visible light, and therefore the intermittent light scan period may be set to a longer period than the visible light scan period. Setting the scan periods in this manner allows the near-infrared light to be detected so as to be able to acquire a signal strength sufficient for the determination by the determination part without reducing the resolution of the visible light optical sensor (i.e., without reducing the accuracy of the determination based on the visible light).

According to an eighth aspect of the present invention, in the seventh aspect, the intermittent light scan period is set to be N times as long as the visible light scan period (N is an integer equal to or greater than 2). According to this aspect, the timing of the end of the last intermittent light scan period and the timing of the end of the last visible light scan period with respect to the one sorting target are synchronized with each other by setting the timing of the start of the first intermittent light scan period and the timing of the start of the first visible light scan period with respect to the one sorting target so as to synchronize them. Therefore, the determination part can easily associate the image based on the signal acquired by the first optical sensor and the image based on the signal acquired by the second optical sensor with respect to the same sorting target. Therefore, the calculation processing by the determination part can be simplified.

According to a ninth aspect of the present invention, in the seventh or eighth aspect, the invisible light is near-infrared light. According to this aspect, the near-infrared light can be detected so as to be able to acquire a signal strength sufficient for the determination by the determination part without reducing the resolution of the visible light optical sensor.

According to a tenth aspect of the present invention, in any of the first to ninth aspects, the optical sensor is a CMOS sensor. The lighting period is ended at the same time as a start of a readout of charges in the CMOS sensor or is ended at a timing later than the start of the readout and earlier than completion of the readout of the charges. According to this aspect, at least a part of a charge readout period is set as the non-lighting period, and therefore the intermittent light source can be prevented from being wastefully kept in the on-state during the charge readout period in which no charge is accumulated.

According to an eleventh aspect of the present invention, in the first or second aspect, the intermittent light source includes a first intermittent light source configured to emit first light having a first wavelength in a first wavelength range and a second intermittent light source configured to emit second light having a second wavelength in the first wavelength range that is different from the first wavelength. The optical sorter further includes an additional light source configured to emit third light having a third wavelength in a second wavelength range outside the first wavelength range toward the plurality of sorting targets in transit. The optical sensor integrally includes a first light receiving element having predetermined or higher sensitivity in the first wavelength range and a second light receiving element having predetermined or higher sensitivity in the second wavelength range, and a spectroscope configured to separate incident light into light in the first wavelength range and light in the second wavelength range. The plurality of intermittent light scan periods includes a first intermittent light scan period and a second intermittent light scan period. The light source control part is configured to control the intermittent light source and the additional light source in such a manner that the first intermittent light source is turned on, the second intermittent light source is off, and the additional light source is at least partially on during the first intermittent light scan period, and to control the intermittent light source and the additional light source in such a manner that the first intermittent light source is off, the second intermittent light source is turned on, and the additional light source is at least partially on during the second intermittent light scan period. According to this aspect, three kinds of light having wavelengths different from one another (i.e., the above-described first light, second light, and third light) can be detected using one optical sensor. As a result, the cost of the optical sorter can be reduced. In addition, the third light is emitted during both the first intermittent light scan period and the second intermittent light scan period, and therefore a sufficient detection intensity can be secured with respect to the third light.

According to a twelfth aspect of the present invention, an optical sorter is provided. This optical sorter includes a first light source configured to emit first light toward a plurality of sorting targets in transit and disposed on a first side with respect to a transit route of the sorting targets, a second light source configured to emit second light having the same wavelength as the first light toward the plurality of sorting targets in transit and disposed on a second side opposite from the first side, a first optical sensor disposed on the first side and configured to detect the first light or the second light associated with one sorting target among the plurality of sorting targets in transit during a plurality of scan periods including a first scan period and a second scan period, a second optical sensor disposed on the second side and configured to detect the first light or the second light associated with the one sorting target during the plurality of scan periods, a determination part configured to determine a foreign object and/or a defective product with respect to the one sorting target based on signals acquired by the first optical sensor and the second optical sensor, and a light source control part configured to control the first light source and the second light source in such a manner that the first light source is at least partially on and the second light source is off during the first scan period and the first light source is off and the second light source is at least partially turned on during the second scan period. According to this aspect, advantageous effects similar to the third aspect can be achieved.

According to a thirteenth aspect of the present invention, in the twelfth aspect, the first light and the second light are red light. According to this aspect, advantageous effects similar to the fourth aspect can be achieved.

According to a fourteenth aspect of the present invention, in the twelfth or thirteenth aspect, the optical sorter includes a third light source disposed on the first side and configured to emit third light having a wavelength different from the first light, and a fourth light source disposed on the second side and configured to emit fourth light having the same wavelength as the third light. The light source control part is configured to control the third light source and the fourth light source in such a manner that the third light source and the fourth light source are at least partially on during both the first scan period and the second scan period. According to this aspect, advantageous effects similar to the fifth aspect can be achieved.

According to a fifteen aspect of the present invention, in the fourteenth aspect, each of the third light and the fourth light includes green light and blue light. According to this aspect, advantageous effects similar to the sixth aspect can be achieved.

According to a sixteenth aspect, an optical sorter is provided. This optical sorter includes a first light source configured to emit first light having a wavelength in an invisible wavelength region toward a plurality of sorting targets in transit, a second light source configured to emit second light having a wavelength in a visible wavelength region toward the plurality of sorting targets in transit, a first optical sensor configured to detect the first light associated with one sorting target among the plurality of sorting targets in transit during a plurality of first scan periods, a second optical sensor configured to detect the second light associated with the one sorting target during a plurality of second scan periods, and a determination part configured to determine a foreign object and/or a defective product with respect to the one sorting target based on a signal acquired by the first optical sensor and a signal acquired by the second optical sensor. The first scan period and the second scan period are defined based on times having different lengths from each other, respectively. According to this aspect, advantageous effects similar to the seventh aspect can be achieved.

According to a seventeenth aspect of the present invention, in the sixteenth aspect, the first scan period is set to be N times as long as the second scan period (N is an integer equal to or greater than 2). According to this aspect, advantageous effects similar to the eighth aspect can be achieved.

According to an eighteenth aspect of the present invention, in the sixteenth or seventeenth aspect, the first light is near-infrared light. According to this aspect, advantageous effects similar to the ninth aspect can be achieved.

According to a nineteenth aspect of the present invention, an optical sorter is provided. This optical sorter includes a light source configured to intermittently emit light toward a plurality of sorting targets in transit, a CMOS sensor configured to detect the light associated with one sorting target among the plurality of sorting targets in transit during a plurality of scan periods, a determination part configured to determine a foreign object and/or a defective product with respect to the one sorting target based on a signal acquired by the CMOS sensor, and a light source control part configured to control the light source. The light source control part is configured to, in a case where the light source is at least partially on during at least one scan period among the plurality of scan periods, control the light source in such a manner that a lighting period during which the light source is on and a non-lighting period during which the light source is off are provided and the lighting period is ended at the same time as a start of a readout of charges in the CMOS sensor or is ended at a timing later than the start of the readout and earlier than completion of the readout of the charges in each of the at least one scan period. According to this aspect, advantageous effects similar to the tenth aspect can be achieved.

According to a twentieth aspect of the present invention, an optical sorter is provided. This optical sorter includes a first light source configured to intermittently emit first light having a first wavelength in a first wavelength range toward a plurality of sorting targets in transit, a second light source configured to intermittently emit second light having a second wavelength in the first wavelength range toward the plurality of sorting targets in transit, a third light source configured to emit third light having a third wavelength in a second wavelength range outside the first wavelength range toward the plurality of sorting targets in transit, and an optical sensor. The optical sensor integrally includes a first light receiving element having predetermined or higher sensitivity in the first wavelength range and a second light receiving element having predetermined or higher sensitivity in the second wavelength range, and a spectroscope configured to separate incident light into light in the first wavelength range and light in the second wavelength range. The optical sensor detects one of the first light and the second light associated with one sorting target among the plurality of sorting targets in transit, and the third light associated with the one sorting target during a plurality of scan periods including a first scan period and a second scan period. The optical sorter further includes a determination part configured to determine a foreign object and/or a defective product with respect to the one sorting target based on a signal acquired by the optical sensor, and a light source control part configured to control the first light source, the second light source, and the third light source in such a manner that the first light source is at least partially on, the second light source is off, and the third light source is at least partially on during the first scan period, and the first light source is off, the second light source is at least partially on, and the third light source is at least partially on during the second scan period. According to this aspect, advantageous effects similar to the eleventh aspect can be achieved.

According to a twenty-first aspect of the present invention, an optical sorter is provided. This optical sorter includes a first light source configured to emit first light having a first wavelength in a first wavelength range toward a plurality of sorting targets in transit, a second light source configured to emit second light having a second wavelength in the first wavelength range toward the plurality of sorting targets in transit, a third light source configured to emit third light having a third wavelength in a second wavelength range outside the first wavelength range toward the plurality of sorting targets in transit, a fourth light source configured to emit fourth light having a fourth wavelength in the second wavelength range toward the plurality of sorting targets in transit, and an optical sensor. The optical sensor integrally includes a first light receiving element having predetermined or higher sensitivity in the first wavelength range and a second light receiving element having predetermined or higher sensitivity in the second wavelength range, and a spectroscope configured to separate incident light into light in the first wavelength range and light in the second wavelength range. The optical sensor detects three kinds of light between the first light, the second light, the third light, and the fourth light associated with one sorting target among the plurality of sorting targets in transit during a plurality of scan periods including a first scan period and a second scan period. The optical sorter further includes a determination part configured to determine a foreign object and/or a defective product with respect to the one sorting target based on a signal acquired by the optical sensor, and a light source control part configured to control the first light source, the second light source, the third light source, and the fourth light source in a mode selected from a first mode and a second mode. In the first mode, the first light source is at least partially on, the second light source is off, one of the third light source and the fourth light source is at least partially on, and the other of the third light source and the fourth light source is off during the first scan period, and the first light source is off, the second light source is at least partially on, the one of the third light source and the fourth light source is at least partially on, and the other of the third light source and the fourth light source is off in the second scan period. In the second mode, one of the first light source and the second light source is at least partially on, the other of the first light source and the second light source is off, the third light source is at least partially on, and the fourth light source is off during the first scan period, and the one of the first light source and the second light source is at least partially on, the other of the first light source and the second light source is off, the third light source is off, and the fourth light source is at least partially on during the second scan period. According to this aspect, advantageous effects similar to the eleventh aspect can be achieved. In addition, the wavelength of the light to be used can be changed, by selecting one of the first mode and the second mode, according to the kind of the sorting target or according to the kind of the foreign object and/or the defective product that should be sorted.

The above-described various aspects may be realized in combination with any configuration of known another optical sorter. For example, the first aspect may be combined with the aspect of a conventional optical sorter including a continuous light source that continuously emits light toward the plurality of sorting targets in transit and an optical sensor that detects the light emitted from the continuous light source.

DESCRIPTION OF EMBODIMENTS

A. First Embodiment

Figure 1:
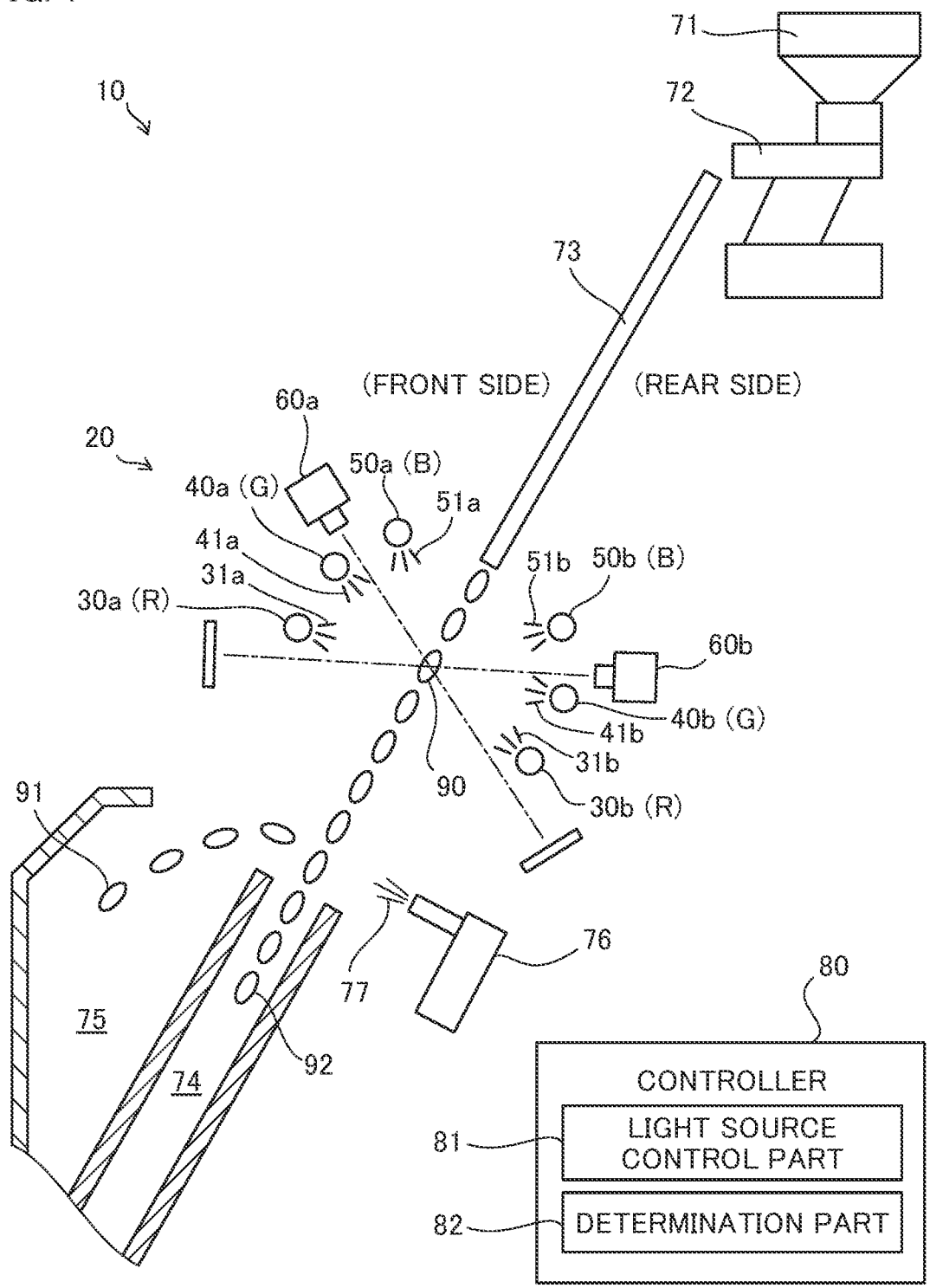
FIG. 1 is a schematic view illustrating an outline of the configuration of an optical sorter according to a first embodiment of the present invention.

FIG. 1 is a schematic view illustrating an outline of the configuration of an optical sorter (hereinafter simply referred to as a sorter) 10 according to a first embodiment of the present invention. In the present embodiment, the sorter 10 is used to sort a foreign object (for example, a small stone, mud, and a glass piece) and a defective product (for example, an immature grain and a colored grain) from rice set as a sorting target (hereinafter simply referred to as a target) 90. However, the target 90 is not limited to rice, and may be any granular object (for example, a grain other than the rice, and plastic).

As illustrated in FIG. 1, the sorter 10 includes an optical detection unit 20, a storage tank 71, a feeder 72, a chute 73, an acceptable product discharge gutter 74, a defective product discharge gutter 75, an ejector 76, and a controller 80. The controller 80 controls the overall operation of the sorter 10. The controller 80 also functions as a light source control part 81 and a determination part 82. The functions of the controller 80 may be realized by a CPU executing a predetermined program or may be realized by a dedicated circuit. The light source control part 81 and the determination part 82 may be realized by a single integrated device. For example, the light source control part 81 and the determination part 82 may be two functions realized by a single CPU. Alternatively, the light source control part 81 and the determination part 82 may be realized as individual different devices from each other. The details of the functions of the controller 80 will be described below.

The storage tank 71 temporarily stores the target 90 therein. The feeder 72 feeds the target 90 stored in the storage tank 71 onto the chute 73. The optical detection unit 20 irradiates the target 90 sliding down from the chute 73 with light, and detects light associated with the target 90 (more specifically, transmitted light transmitted through the target 90 and/or reflected light reflected by the target 90). An output from the optical detection unit 20, i.e., an analog signal indicating a detected light intensity is converted into a digital signal by an AC/DC converter (not illustrated). This digital signal is input to the controller 80. The controller 80 determines, as processing by the determination part 82, whether the target 90 is an acceptable product (i.e., a relatively high-quality rice grain), or a foreign object (i.e., something that is not a rice grain) or a defective product (i.e., a relatively low-quality rice grain) based on the input light detection result (i.e., an image). This determination is made with respect to each target 90.

If the target 90 is determined to be a foreign object or a defective product, the ejector 76 ejects air 77 toward this target 90. As a result, the target 90 is blown off, deviated from a falling trajectory from the chute 73, and guided to the defective product discharge gutter 75. On the other hand, if the target 90 is determined to be an acceptable product, the air 77 is not ejected. Therefore, the target 90 determined to be an acceptable product is guided to the acceptable product discharge gutter 74 without changing the falling trajectory thereof.

In the following description, the details of the optical detection unit 20 and the controller 80 will be described. As illustrated in FIG. 1, the optical detection unit 20 includes a first light source 30a, a second light source 30b, third light sources 40a and 50a, fourth light sources 40b and 50b, a first optical sensor 60a, and a second optical sensor 60b.

The first light source 30a emits first light 31a toward a plurality of targets 90 in transit (i.e., being falling from the chute 73). Similarly, the second light source 30b emits second light 31b toward the plurality of targets 90 in transit. In the present embodiment, the first light 30a is red light. The second light 31b has the same wavelength as the first light 31a. In other words, the second light 31b is also red light. Therefore, the first light source 30a and the second light source 30b will also be referred to as red light sources 30a and 30b. Further, the first light 31a and the second light 31b will also be referred to as red light beams 31a and 31b.

The third light sources 40a and 50a emit third light beams 41a and Ma toward the plurality of targets 90 in transit, respectively. The fourth light sources 40b and 50b emit fourth light beams 41b and 51b toward the plurality of targets 90 in transit, respectively. The third light beams 41a and 51a have different wavelengths from the first light 31a. In the present embodiment, the third light 41a is green light, and the third light 51a is blue light. The fourth light beams 41b and 51b have the same wavelengths as the third light beams 41a and 51a, respectively. In other words, the fourth light 41b is green light, and the fourth light Mb is blue light. Therefore, the third light source 40a and the fourth light source 40b will also be referred to as green light sources 40a and 40b. Further, the third light 41a and the fourth light 41b will also be referred to as green light beams 41a and 41b, respectively. Similarly, the third light source 50a and the fourth light source 50b will also be referred to as blue light sources 50a and 50b, and the third light 51a and the fourth light 51b will also be referred to as blue light beams 51a and 51b.

In the present embodiment, the first light source 30a, the second light source 30b, the third light sources 40a and 50a, and the fourth light sources 40b and 40b are LEDs. FIG. 1 illustrates the first light source 30a, the second light source 30b, the third light sources 40a and 50a, and the fourth light sources 40b and 50b assuming that the number of light sources is one for each of them, but the number of light sources may be plural for each with respect to at least a part of these light sources.

The first optical sensor 60a and the second optical sensor 60b detect light associated with one target 90 among the plurality of targets 90 in transit. The first optical sensor 60a and the second optical sensor 60b are color CCD sensors in the present embodiment, and can detect red light, green light, and blue light individually separately. However, the first optical sensor 60a and the second optical sensor 60b may be another type of color sensors such as color CMOS sensors. Further, the first optical sensor 60a and the second optical sensor 60b are line sensors in the present embodiment but may be area sensors.

The first light source 30a, the third light sources 40a and 50a, and the first optical sensor 60a are disposed on one side (also referred to as a front side) with respect to a transit route of the target 90 (i.e., the falling trajectory from the chute 73). On the other hand, the second light source 30b, the fourth light sources 40b and 50b, and the second optical sensor 60b are disposed on the other side (also referred to as a rear side) with respect to the transit route of the target 90.

The first optical sensor 60a on the front side can detect the red light 31a emitted from the first light source 30a on the front side and reflected by the target 90 (also referred to as the reflected red light 31a), the green light 41a emitted from the third light source 40a on the front side and reflected by the target 90 (also referred to as the reflected green light 41a), the blue light 51a emitted from the third light source 50a on the front side and reflected by the target 90 (also referred to as the reflected blue light 51a), the red light 31b emitted from the second light source 30b on the rear side and transmitted through the target 90 (also referred to as the transmitted red light 31b), the green light 41b emitted from the fourth light source 40b on the rear side and transmitted through the target 90 (also referred to as the transmitted green light 41b), and the blue light 51b emitted from the fourth light source 50b on the rear side and transmitted through the target 90 (also referred to as the transmitted blue light 51b).

The second optical sensor 60b on the rear side can detect the red light 31b emitted from the second light source 30b on the rear side and reflected by the target 90 (also referred to as the reflected red light 31b), the green light 41b emitted from the fourth light source 40b on the rear side and reflected by the target 90 (also referred to as the reflected green light 41b), the blue light 51b emitted from the fourth light source 50b on the rear side and reflected by the target 90 (also referred to as the reflected blue light 51b), the red light 31a emitted from the first light source 30a on the front side and transmitted through the target 90 (also referred to as the transmitted red light 31a), the green light 41a emitted from the third light source 40a on the front side and transmitted through the target 90 (also referred to as the transmitted green light 41a), and the blue light 51a emitted from the third light source 50a on the front side and transmitted through the target 90 (also referred to as the transmitted blue light 51a).

As widely known, the first optical sensor 60a and the second optical sensor 60b scan one target 90 a plurality of times. In other words, the first optical sensor 60a and the second optical sensor 60b detect the light associated with the one target 90 during each of a plurality of scan periods. The scan period refers to a duration from a start to an end of one scan. The entire image of this one target 90 is acquired by combining images acquired from the respective scans. The "scan period" can be defined to mean a duration since a light receiving element starts the accumulation of charges until the light receiving element ends the accumulation of charges in the case where the optical sensor is a CCD sensor. The "scan period" can be defined to mean a duration since a light receiving element starts the accumulation of charges until the light receiving element outputs the accumulated charges in the case where the optical sensor is a CMOS sensor.

Figure 2:
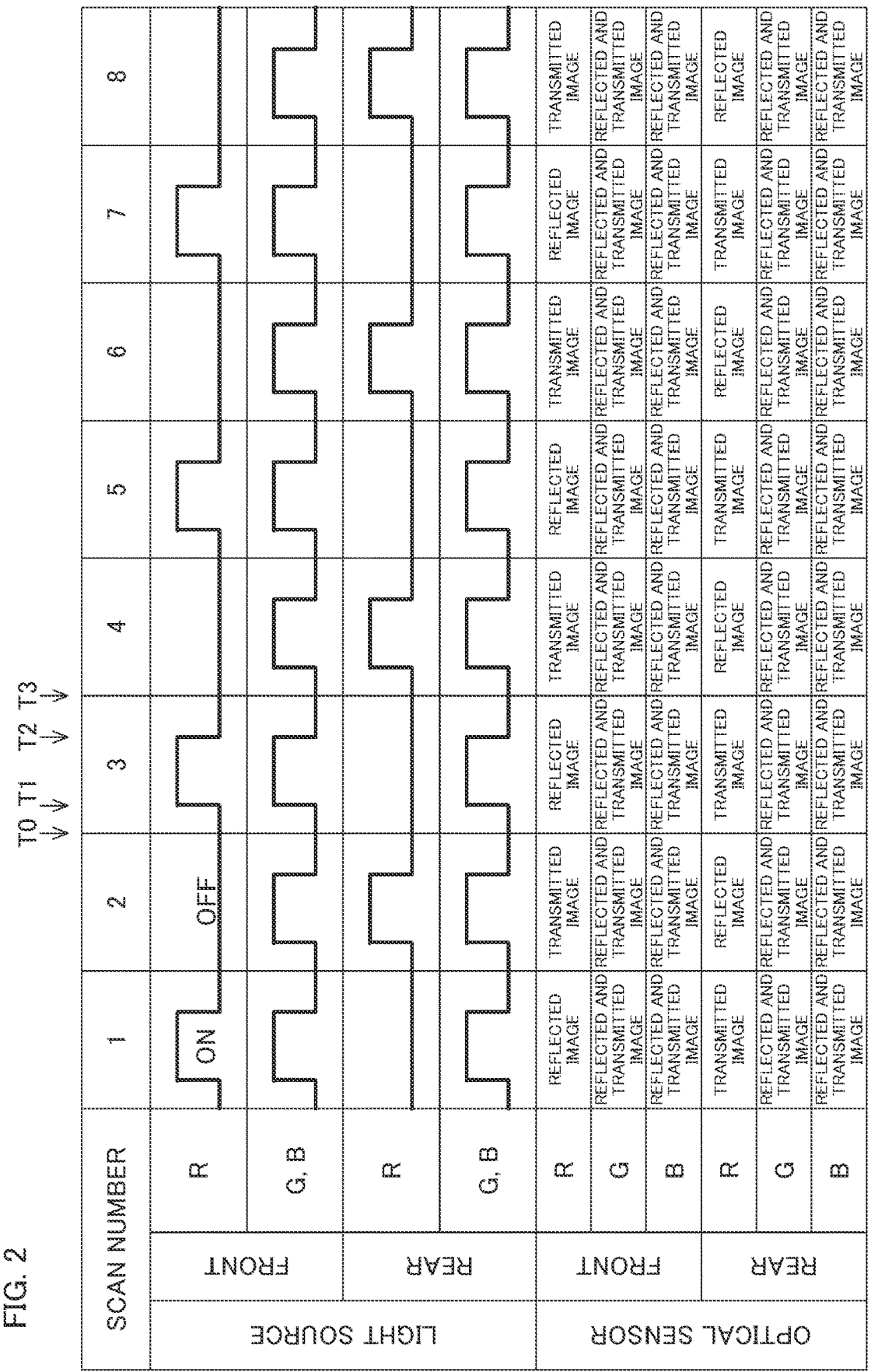
FIG. 2 is a timing chart illustrating the relationship between scan periods of optical sensors and timings of turning on light sources.

The optical detection unit 20 configured in this manner is controlled by the controller 80. The light source control part 81 controls the first light source 30a, the second light source 30b, the third light sources 40a and 50a, and the fourth light sources 40b and 50b according to a predetermined rule. FIG. 2 is a timing chart illustrating the relationship between the scan periods of the first and second optical sensors 60a and 60b and timings of turning on these light sources. In FIG. 2, "R" represents the red light source 30a or the red light source 30b. Similarly, "G" represents the green light source 40a or the green light source 40b, and "B" represents the blue light source 50a or the blue light source 50b.

Figure 3:
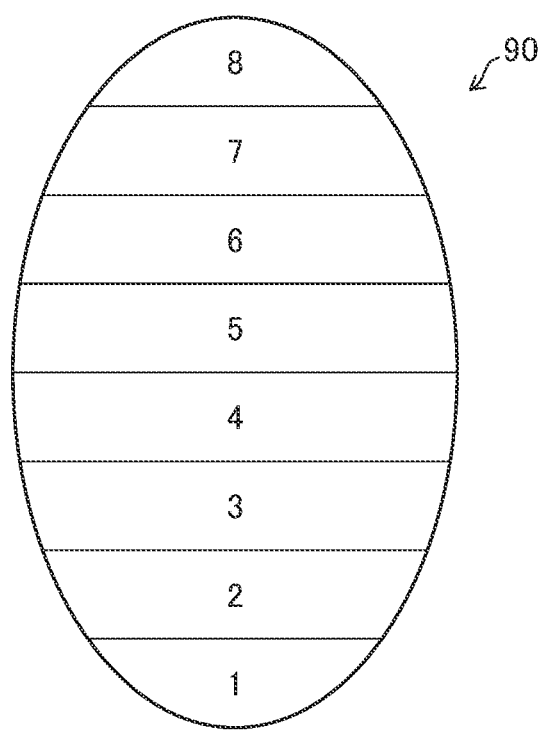
FIG. 3 illustrates the relationship between one sorting target and scan numbers.

FIG. 3 illustrates the relationship between the one target 90 and scan numbers of the first optical sensor 60a and the second optical sensor 60b (numbers each indicating what number scan this scan is). As illustrated in FIG. 3, in the present embodiment, the image data is acquired by scanning the one target 90 eight times (citing an example supposing that the target 90 is scanned a smaller number of times than the actual number of times for simplification of the description). The numbers 1 to 8 illustrated in FIG. 3 each indicate the number of a scan by which the image data of the corresponding region is acquired. For example, the region labeled "1" indicates that the image data is acquired by the first scan. In FIG. 2, "SCAN NUMBER" corresponds to the scan number illustrated in FIG. 3.

As illustrated in FIG. 2, the red light source 30a on the front side is turned on for a predetermined time only during scan periods having odd scan numbers (indicated with ON in FIG. 2), and is turned off entirely during scan periods having even scan numbers (indicated with OFF in FIG. 2). On the other hand, the red light source 30b on the rear side is turned on for a predetermined time only during the scan periods having the even scan numbers, and is turned off entirely during the scan periods having the odd scan numbers. In this manner, the red light source 30a and the red light source 30b are alternately turned on in such a manner that only any one of them is turned on during one scan period. In other words, the red light source 30a and the red light source 30b are turned on mutually exclusively.

The green light source 40a and the blue light source 50a on the front side are turned on for a predetermined time during each of all the scan periods. Similarly, the green light source 40b and the blue light source 50b on the rear side are turned on for a predetermined time during each of all the scan periods.

According to such a lighting method, the first optical sensor 60a on the front side detects the reflected red light 31a, light acquired by combining the reflected green light 41a and the transmitted green light 41b, and light acquired by combining the reflected blue light 51a and the transmitted blue light 51b individually separately during the scan periods having the odd scan numbers. In other words, a red reflected image, a green reflected and transmitted image, and a blue reflected and transmitted image can be acquired via the first optical sensor 60a. As used herein, the reflected image refers to an image expressed only by reflected light. The transmitted image refers to an image expressed only by transmitted light. The reflected and transmitted image refers to an image expressed by light acquired by combining reflected light and transmitted light.

Further, the first optical sensor 60a on the front side detects the transmitted red light 31b, light acquired by combining the reflected green light 41a and the transmitted green light 41b, and light acquired by combining the reflected blue light 51a and the transmitted blue light 51b individually separately during the scan periods having the even scan numbers. In other words, a red transmitted image, a green reflected and transmitted image, and a blue reflected and transmitted image can be acquired via the first optical sensor 60a.

On the other hand, the second optical sensor 60b on the rear side detects the transmitted red light 31a, light acquired by combining the reflected green light 41b and the transmitted green light 41a, and light acquired by combining the reflected blue light 51b and the transmitted blue light 51a individually separately during the scan periods having the odd scan numbers. In other words, a red transmitted image, a green reflected and transmitted image, and a blue reflected and transmitted image can be acquired via the second optical sensor 60*b*.

Further, the second optical sensor 60*b* on the rear side detects the reflected red light 31*b*, light acquired by combining the reflected green light 41*b* and the transmitted green light 41*a*, and light acquired by combining the reflected blue light 51*b* and the transmitted blue light 51*a* individually separately during the scan periods having the even scan numbers. In other words, a red reflected image, a green reflected and transmitted image, and a blue reflected and transmitted image can be acquired via the second optical sensor 60*b*.

The determination part 82 determines a foreign object and/or a defective product using the red reflected images and transmitted images, the green reflected and transmitted images, and the blue reflected and transmitted images acquired in this manner. More specifically, because acquiring a front-side red reflected image formed by the regions numbered with the odd scan numbers, a front-side red transmitted image formed by the regions numbered with the even scan numbers, a rear-side red transmitted image formed by the regions numbered with the odd scan numbers, a rear-side red reflected image formed by the regions numbered with the even scan numbers, a front-side green reflected and transmitted image formed by the regions numbered with the scan numbers of 1 to 8 in FIG. 3, a front-side blue reflected and transmitted image formed by the regions numbered with the scan numbers of 1 to 8, a rear-side blue reflected and transmitted image formed by the regions numbered with the scan numbers of 1 to 8, and a rear-side blue reflected and transmitted image formed by the regions numbered with the scan numbers of 1 to 8, the determination part 82 determines a foreign object and/or a defective product by comparing all or a part of these images with a predetermined threshold value(s). A known arbitrary determination method can be employed as a method for this determination.

According to the above-described sorter 10, the scan period during which only one of the red light source 30*a* on the front side and the red light source 30*b* on the rear side is turned on, and the scan period during which only the other of them is turned on are set. Therefore, the determination part 82 can determine a foreign object and/or a defective product based on the red transmitted image and reflected image on the front side and the red transmitted image and reflected image on the rear side. Therefore, the determination accuracy can be increased compared to when the determination is made based on the red transmitted image and reflected image on any one of the front side and the rear side. The red transmitted image and reflected image are suitable to distinguish, for example, a milky grain in the case where the target 90 is rice. Generally, most of milky grains are clouded all over the grains, but some of them may have a clouded portion partially. When such a milky grain having a clouded portion partially (i.e., the target 90) falls down from the chute 73, the clouded portion may appear only in the transmitted image or the reflected image on any one of the front side and the rear side depending on which direction this target 90 faces. According to the above-described sorter 10, the clouded portion can be detected and the target 90 can be distinguished as a milky grain even in such a case.

Further, according to the sorter 10, the green reflected and transmitted images on both the front side and the rear side and the blue reflected and transmitted images on both the front side and the rear side can be acquired, and therefore the determination part 82 can distinguish a larger number of kinds of foreign objects and/or defective products. The green reflected and transmitted image and the blue reflected and transmitted image are suitable to distinguish, for example, a colored grain in the case where the target 90 is rice. In addition, the green light source 40*a* and the green light source 40*b* are turned on during all the scan periods, and therefore the resolution does not reduce with respect to the green reflected and transmitted image. The same also applies to the blue reflected and transmitted image.

As illustrated in FIG. 2, in the case where any of the light sources is turned on during at least one scan period (for example, in the case where the red light source 30*a* on the front side is turned on during the scan periods having the odd scan numbers), the light source control part 81 controls this light source in such a manner that a lighting period during which this light source is on and a non-lighting period during which this light source is off are provided in this scan period. For example, in the example illustrated in FIG. 2, the red light source 30*a* on the front side has, in the third scan period, a non-lighting period from a start time T0 of the scan period to a time T1, a lighting period from the time T1 to a time T2, and a non-lighting period from the time T2 to an end time T3 of the scan period.

Further, in the case where any of the light sources is turned on during at least one scan period, the light source control part 81 controls this light source in such a manner that the lighting period starts at a timing delayed behind the start of this scan period. For example, in the example illustrated in FIG. 2, the red light source 30*a* on the front side is turned on in the third scan period in such a manner that the lighting period thereof starts at a timing (i.e., the time T1) delayed behind the start time T0 of the scan period. In other words, the red light source 30*a* remains in an off-state at the start time T0 of the scan period. Therefore, the red light 31*a* emitted from the red light source 30*a* on the front side during the third scan period is not detected by the first optical sensor 60*a* or the second optical sensor 60*b* during a scan period immediately preceding thereto (i.e., the second scan period). More specifically, hypothetically supposing that the red light source 30*a* on the front side is turned on at the start time T0 in the third scan period (this is also the end time of the second scan period), the red light 31*a* emitted at the same time as the start of the third scan period might be mixed in the result of the detection by the first optical sensor 60*a* or the second optical sensor 60*b* in the second scan period as noise. On the other hand, according to the present embodiment, such a phenomenon can be prevented and therefore the accuracy of the determination by the determination part 82 can be increased. This effect has been described citing the red light source 30*a* on the front side as an example, but also applies to all the light sources in common without being limited to the red light source 30*a* on the front side.

Further, in the case where any of the light sources is turned on during at least one scan period, the light source control part 81 controls this light source in such a manner that the lighting period thereof is ended at a timing earlier than the end of this scan period. For example, in the example illustrated in FIG. 2, the red light source 30*a* on the front side is switched from an on-state to an off-state at the time T2 earlier than the end time T3 of the scan period in the third scan period. Therefore, the red light 31*a* emitted from the red light source 30*a* on the front side during the third scan period is not detected by the first optical sensor 60*a* or the second optical sensor 60*b* during a scan period immediately subsequent thereto (i.e., the fourth scan period). Therefore, the accuracy of the determination by the determination part 82 can be increased. This effect has been described citing the red light source 30a on the front side as an example, but also applies to all the light sources in common without being limited to the red light source 30a on the front side.

The above-described embodiment can be modified in various manners. For example, instead of the red light sources 30a and 30b, light sources that emit light beams having arbitrary wavelengths not interfering with the wavelength(s) of the light beam(s) emitted from the other light source(s) may be provided on the front side and the rear side and may be alternately turned on between the front side and the rear side. For example, the green light sources 40a and 40b may be alternately turned on, or the blue light sources 50a and 50b may be alternately turned on. Further, all the light sources emit the light intermittently in the above-described example, but the green light sources 40a and 40b and/or the blue light sources 50a and 50b may be continuously on throughout all the scan periods. Further, in the case where the red light sources 30a and 30b are turned on during at least one scan period, the red light sources 30a and 30b may be continuously on from the start time T0 to the end time T3 of this at least one scan period.

B. Second Embodiment

Figure 4:
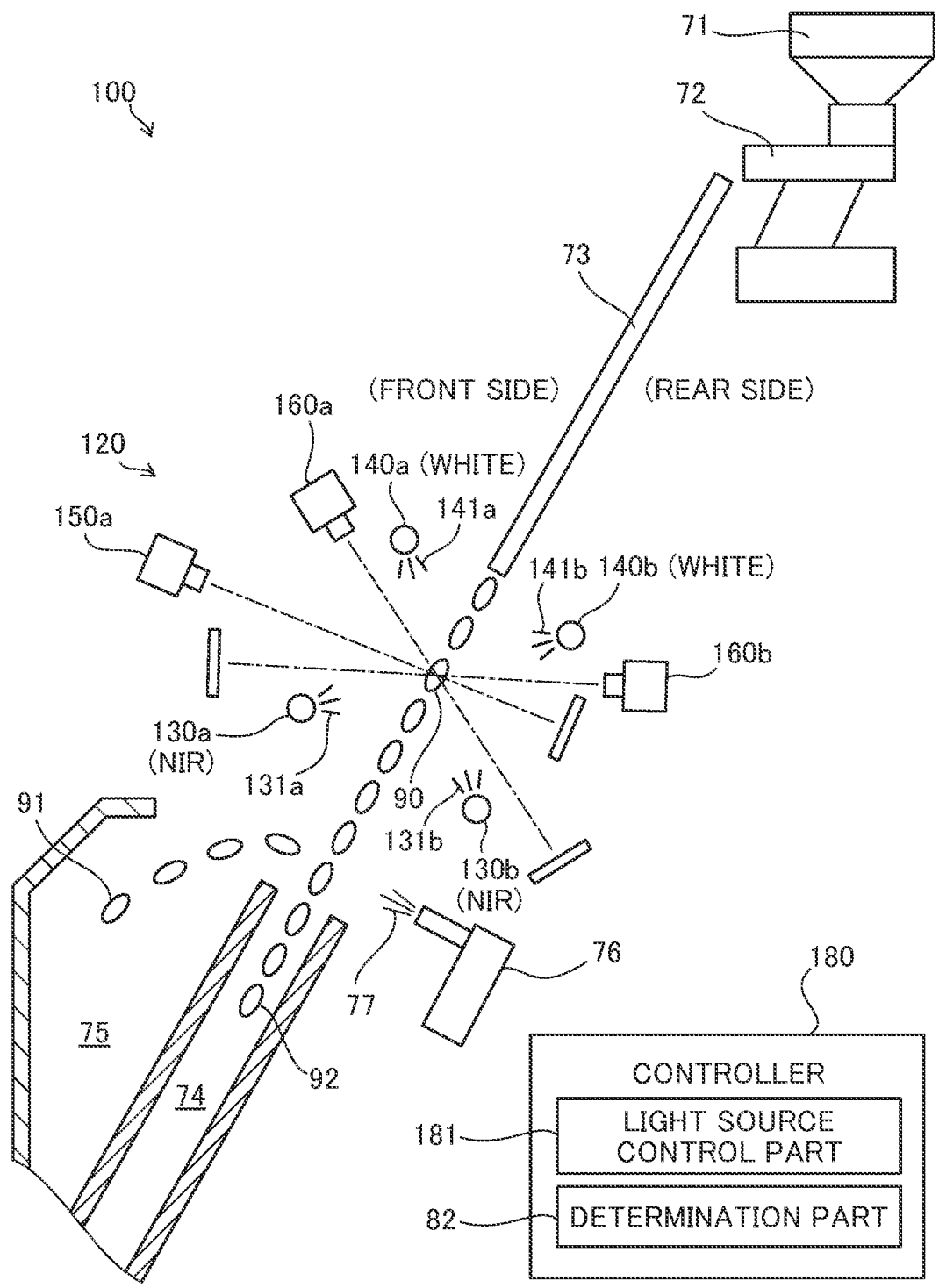
FIG. 4 is a schematic view illustrating an outline of the configuration of an optical sorter according to a second embodiment.

In the following description, an optical sorter (hereinafter simply referred to as a sorter) 100 according to a second embodiment of the present invention will be described. The sorter 100 is different from the first embodiment in terms of including an optical detection unit 120 instead of the optical detection unit 20 according to the first embodiment and including a controller 180 instead of the controller 80 according to the first embodiment. In the following description, the second embodiment will be described focusing only on differences from the first embodiment. FIG. 4 is a schematic view illustrating an outline of the configuration of the sorter 100. In FIG. 4, components similar to the first embodiment (FIG. 1) among the illustrated components are identified by the same reference numerals as the reference numerals assigned in the first embodiment. As illustrated in FIG. 4, the optical detection unit 120 includes first light sources 130a and 130b, second light sources 140a and 140b, a first optical sensor 150a, and second optical sensors 160a and 160b.

The first light sources 130a and 130b emit first light beams 131a and 131b having wavelengths in an invisible wavelength region toward the target 90 in transit, respectively. In the present embodiment, the first light beams 131a and 131b have wavelengths in a near-infrared wavelength region (for example, 1550 nm). Therefore, the first light sources 130a and 130b will also be referred to as near-infrared light sources 130a and 130b, and the first light beams 131a and 131b will also be referred to as near-infrared light beams 131a and 131b. The second light sources 140a and 140b emit second light beams 141a and 141b having wavelengths in a visible wavelength region toward the target 90 in transit, respectively. In the present embodiment, the second light beams 141a and 141b are white light including red, green, and blue wavelengths. Therefore, the second light sources 140a and 140b will also be referred to as visible light sources 140a and 140b, and the second light beams 141a and 141b will also be referred to as visible light beams 141a and 141b. In the present embodiment, the first light sources 130a and 131b and the second light sources 140a and 140b are LEDs. FIG. 4 illustrates the first light sources 130a and 131b and the second light sources 140a and 140b assuming that the number of light sources is one for each of them, but the number of light sources may be plural for each with respect to at least a part of these light sources.

The first optical sensor 150a detects the near-infrared light beams 131a and 131b associated with one target 90 among the plurality of targets 90 in transit. Therefore, the first optical sensor 150a will also be referred to as the near-infrared light optical sensor 150a. The near-infrared light optical sensor 150a is configured to detect the near-infrared light 131a and/or the near-infrared light 131b during each of a plurality of first scan periods. The second optical sensors 160a and 160b detect the visible light beams 141a and 141b associated with the one target 90 among the plurality of targets 90 in transit. Therefore, the second optical sensors 160a and 160b will also be referred to as the visible light optical sensors 160a and 160b. The visible light optical sensors 160a and 160b are configured to detect the visible light 141a and/or the visible light 141b during each of a plurality of second scan periods. The near-infrared light optical sensor 150a is a CMOS sensor. The visible light optical sensors 160a and 160b are color CCD sensors in the present embodiment, and can detect red light, green light, and blue light individually separately. CMOS sensors may be used as the visible light optical sensors 160a and 160b.

The near-infrared light source 130a, the visible light source 140a, the near-infrared light optical sensor 150a, and the visible light optical sensor 160a are disposed on the front side. On the other hand, the near-infrared light source 130b, the visible light source 140b, and the visible light optical sensor 160b are disposed on the rear side. The near-infrared light optical sensor 150a on the front side can detect the near-infrared light 131a emitted from the near-infrared light source 130a on the front side and reflected by the target 90 and the near-infrared light 131b emitted from the near-infrared light source 130b on the rear side and transmitted through the target 90. The visible light optical sensor 160a on the front side can detect the visible light 141a emitted from the visible light source 140a on the front side and reflected by the target 90 and the visible light 141b emitted from the visible light source 140b on the rear side and transmitted through the target 90. The visible light optical sensor 160b on the rear side can detect the visible light 141a emitted from the visible light source 140a on the front side and transmitted through the target 90 and the visible light 141b emitted from the visible light source 140b on the rear side and reflected by the target 90.

Figure 5:
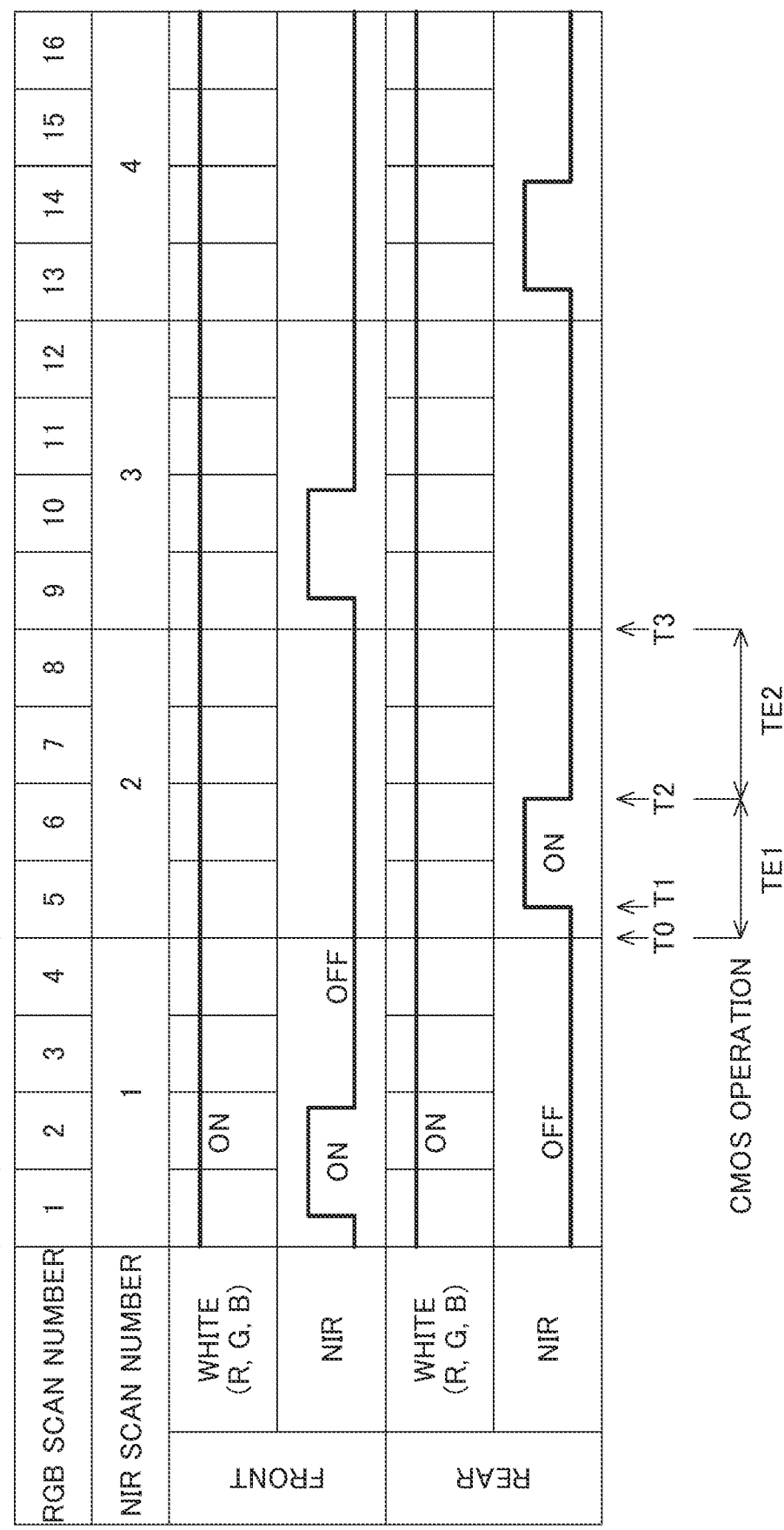
FIG. 5 is a timing chart illustrating the relationship between scan periods of optical sensors and timings of turning on light sources.

The optical detection unit 120 configured in this manner is controlled by the controller 180. A light source control part 181 controls the first light sources 130a and 130b and the second light sources 140a and 140b according to a predetermined rule. FIG. 5 is a timing chart illustrating timings of turning on these light sources. In FIG. 5, "WHITE" represents the visible light source 140a or the visible light source 140b, and "NIR" represents the near-infrared light source 130a or the near-infrared light source 130b. "RGB SCAN NUMBER" indicates each of scan numbers of the visible light optical sensors 160a and 160b. Further, "NIR SCAN NUMBER" indicates each of scan numbers of the near-infrared light optical sensor 150a. FIG. 5 illustrates the timing of turning on each of the light sources assuming that image data based on the visible light beams 141a and 141b is acquired by sixteen scans with respect to the one target 90 and image data based on the near-infrared light beams 131a and 131b is acquired by four scans with respect to the one target 90 for simplification of the description.

As illustrated in FIG. 5, the first scan period for the near-infrared light optical sensor 150a and the second scan period for the visible light optical sensors 160a and 160b are defined based on times having lengths different from each other, respectively. Therefore, the first scan period suitable to detect the near-infrared light beams 131a and 131b and the second scan period suitable to detect the visible light beams 141a and 141b can be set individually separately. In the present embodiment, the first scan period is set as a longer time than the second scan period. Generally, the sensitivity of a near-infrared light optical sensor to near-infrared light is lower than the sensitivity of a visible light optical sensor to visible light. Therefore, the near-infrared light beams 131a and 131b can be detected so as to be able to acquire a signal strength sufficient for the determination by the determination part 82 by setting the first scan period to a longer period than the second scan period. In addition, the second scan period is not set to a long period due to the detection of the near-infrared light beams 131a and 131b, and therefore the resolutions do not reduce with respect to the visible light optical sensors 160a and 160b.

Further, in the present embodiment, the first scan period is set to a period N times as long as the second scan period (N is an integer equal to or greater than 2). In the example illustrated in FIG. 5, N is N=4. When the first scan period is N times as long as the second scan period in this manner, the timing of the end of the last first scan period (i.e., the timing of the end of NIR scan number 4 in FIG. 5) and the timing of the end of the last second scan period (i.e., the timing of the end of RGB scan number 16 in FIG. 5) with respect to the one target 90 are synchronized with each other by setting the timing of the start of the first first scan period (i.e., the timing of the start of NIR scan number 1 in FIG. 5) and the timing of the start of the first second scan period (i.e., the timing of the start of RGB scan number 1 in FIG. 5) with respect to the one target 90 so as to synchronize them. Therefore, the determination part 82 can easily associate the image based on the signal acquired by the near-infrared light optical sensor 150a and the images based on the signals acquired by the visible light optical sensors 160a and 160b with respect to the same target 90. Therefore, the calculation processing by the determination part 82 can be simplified. In the present embodiment, the near-infrared light optical sensor 150a is a CMOS sensor and the visible light optical sensors 160a and 160b are CCD sensors, but employing the same type of sensors as the near-infrared light optical sensor 150a and the visible light optical sensors 160a and 160b allows the timings of outputting the signals acquired from the last scan with respect to the same target 90 to be synchronized between the near-infrared light optical sensor 150a and the visible light optical sensors 160a and 160b.

As illustrated in FIG. 5, the visible light source 140a on the front side and the visible light source 140b on the rear side are constantly on throughout all the scan periods. The near-infrared light source 130a on the front side is on for a predetermined period only during the first scan periods having the odd scan numbers, and is off entirely during the first scan periods having the even scan numbers. On the other hand, the near-infrared light source 130b on the rear side is on for a predetermined time only during the first scan periods having the even scan numbers, and is off entirely during the first scan periods having the odd scan numbers. In this manner, the near-infrared light sources 130a and 130b are alternately turned on in such a manner that only any one of them is turned on during one first scan period. Therefore, the respective reflected and transmitted images of the red light, the green light, and the blue light are acquired during all the second scan periods by the visible light optical sensors 160a and 160b. Further, the reflected images based on the near-infrared light 131a are acquired during the first scan periods having the odd scan numbers and the transmitted images based on the near-infrared light 131b are acquired during the first scan periods having the even scan numbers by the near-infrared light optical sensor 150a. The determination part 82 distinguishes a foreign object and/or a defective product based on the images acquired in this manner.

In the case where the near-infrared light sources 130a and 130b are turned on during one first scan period, the near-infrared light sources 130a and 130b have a non-lighting period from a start time T0 of the first scan period to a time T1, a lighting period from the time T1 to a time T2, and a non-lighting period from the time T2 to an end time T3 of the first scan period. This is similar to the method for turning on each of the light sources according to the first embodiment.

As widely known, a CMOS sensor sequentially performs an operation of accumulating charges and an operation of reading out the accumulated charges in one scan period. The near-infrared light optical sensor 150a is a CMOS sensor as described above, and FIG. 5 illustrates the period during which the near-infrared light optical sensor 150a performs the operation of accumulating charges as a period TE1 and the period during which the near-infrared light optical sensor 150a performs the operation of reading out the charges as a period TE2. In the present embodiment, the timings at which the near-infrared light sources 130a and 130b are on are determined based on the periods TE1 and TE2 of the near-infrared light optical sensor 150a. More specifically, in the case where the near-infrared light source 130a or the near-infrared light source 130b is turned on during a predetermined first scan period, the timing at which the light source is switched from an on-state to an off-state (the time T2 illustrated in FIG. 5) is set to the same time as the start of the readout of the charges in the near-infrared light optical sensor 150a (the start of the period TE2). In other words, the near-infrared light optical sensor 150a is on only during the period TE1 contributive to the accumulation of the charges and is off during the period TE2 not contributive to the accumulation of the charges. According to such a setting, the near-infrared light sources 130a and 130b are prevented from being wastefully kept in an on-state without contributing to the accumulation of the charges. In an alternative embodiment, the timing at which the light source is switched from an on-state to an off-state (the time T2) may be a timing later than the start of the readout of the charges in the near-infrared light optical sensor 150a (the start of the period TE2) and earlier than the completion of the readout of the charges (the end of the period TE2). Even setting the timing in this manner can also achieve the advantageous effect of reducing the wasteful on-state of the near-infrared light sources 130a and 130b to some degree.

The above-described second embodiment can be modified in various manners. For example, a light source that emits light having an arbitrary wavelength in the invisible wavelength region and an optical sensor that detects this light may be used instead of the near-infrared light sources 130a and 130b and the near-infrared light optical sensor 150a. Further, the visible light sources 140a and 140b may be intermittently turned on in such a manner that the lighting period and the non-lighting period are provided in each of the second scan periods. Further, one or more light sources that emit light having an arbitrary wavelength in the visible wavelength region may be provided on the front side and/or the rear side instead of the visible light sources 140a and 140b that emit the white light. Further, a near-infrared light optical sensor may be provided on the rear side in addition to or instead of the near-infrared light optical sensor 150a on the front side.

C. Third Embodiment

Figure 6:
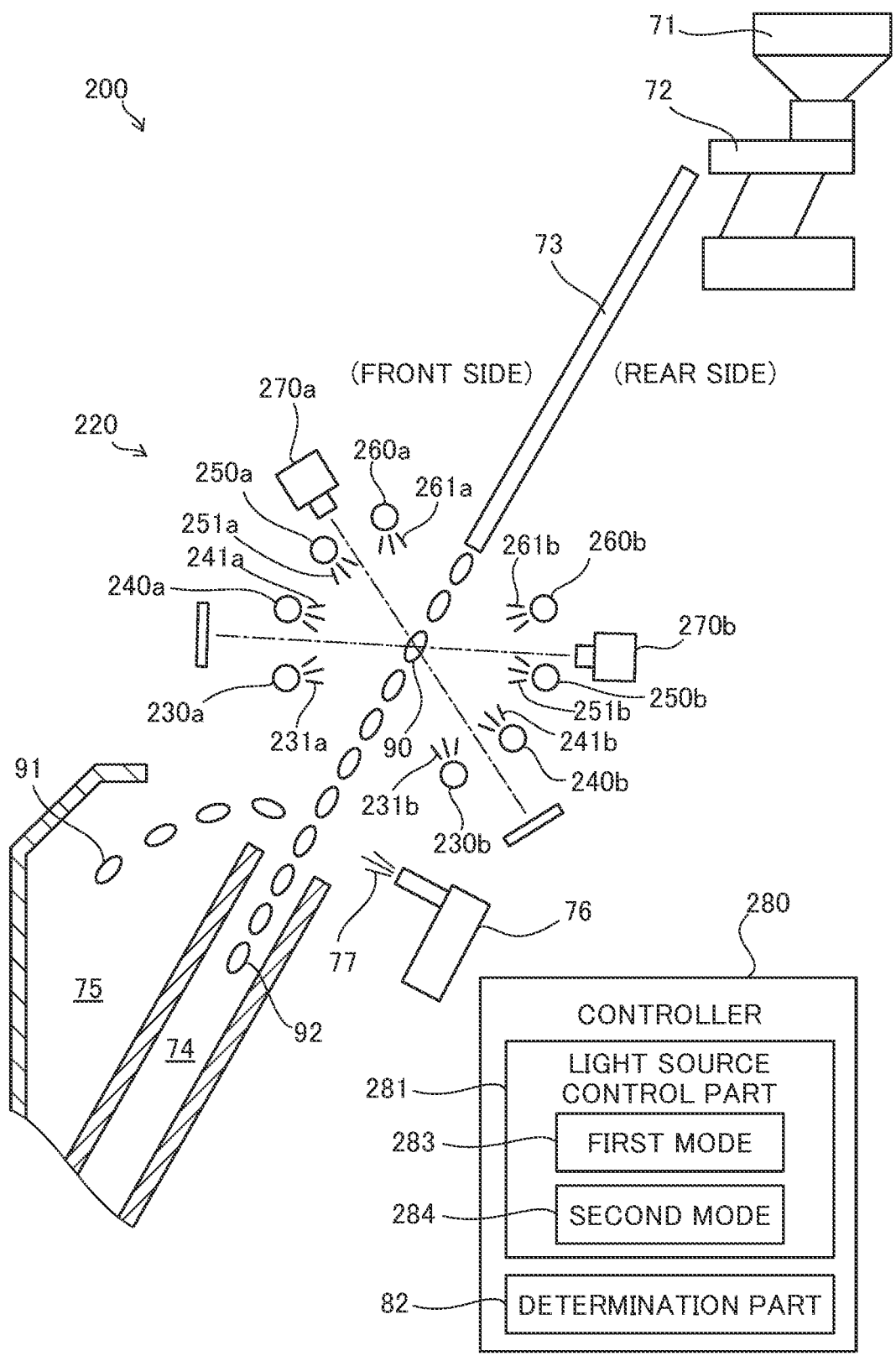
FIG. 6 is a schematic view illustrating an outline of the configuration of an optical sorter according to a third embodiment.

In the following description, an optical sorter (hereinafter simply referred to as a sorter) 200 according to a third embodiment of the present invention will be described. The sorter 200 is different from the first embodiment in terms of including an optical detection unit 220 instead of the optical detection unit 20 according to the first embodiment and including a controller 280 instead of the controller 80 according to the first embodiment. In the following description, the third embodiment will be described focusing only on differences from the first embodiment. FIG. 6 is a schematic view illustrating an outline of the configuration of the sorter 100. In FIG. 6, components similar to the first embodiment (FIG. 1) among the illustrated components are identified by the same reference numerals as the reference numerals assigned in the first embodiment. As illustrated in FIG. 6, the optical detection unit 220 includes first light sources 230a and 230b, second light sources 240a and 240b, third light sources 250a and 250b, fourth light sources 260a and 260b, and optical sensors 270a and 270b.

The first light sources 230a and 230b emit first light beams 231a and 231b each having a first wavelength (750 nm in the present embodiment) in a first wavelength range toward the plurality of targets 90 in transit, respectively. In the present embodiment, the first light sources 230a and 230b have output peaks at 750 nm. The second light sources 240a and 240b emit second light beams 241a and 241b each having a second wavelength (870 nm in the present embodiment) in the first wavelength range toward the plurality of targets 90 in transit, respectively. In the present embodiment, the second light sources 240a and 240b have output peaks at 870 nm. The third light sources 250a and 250b emit third light beams 251a and 251b each having a third wavelength (1200 nm in the present embodiment) in a second wavelength range outside the first wavelength range toward the plurality of targets 90 in transit, respectively. In the present embodiment, the third light sources 250a and 250b have output peaks at 1200 nm. The fourth light sources 260a and 260b emit fourth light beams 261a and 261b each having a fourth wavelength (1550 nm in the present embodiment) in the second wavelength range toward the plurality of targets 90 in transit, respectively. In the present embodiment, the fourth light sources 260a and 260b have output peaks at 1550 nm. In the present embodiment, the first to fourth light sources are LEDs. FIG. 1 illustrates the light sources assuming that the number of light sources is one for each of them, but the number of light sources may be plural for each with respect to at least a part of these light sources.

Figure 7:
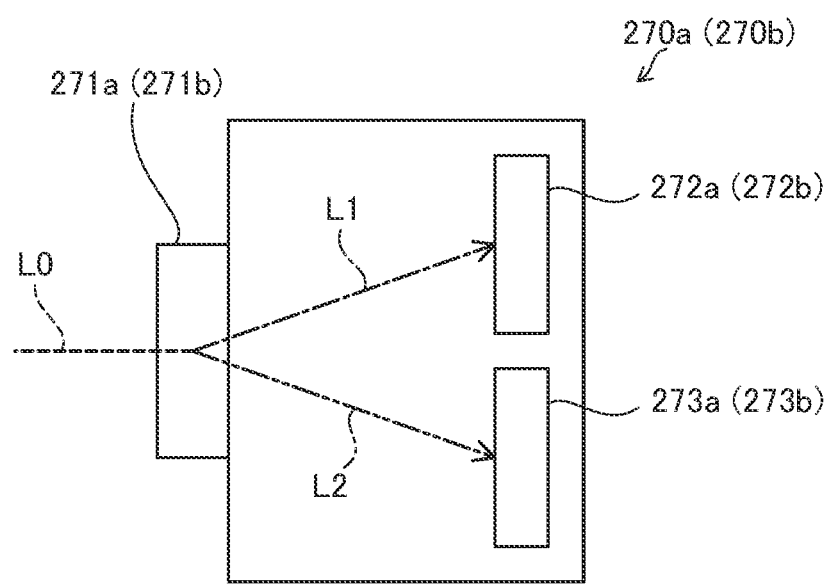
FIG. 7 is a schematic view illustrating an outline of the configuration of each of optical sensors.

FIG. 7 is a schematic view illustrating an outline of the configuration of each of the optical sensors 270a and 270b. The optical sensors 270a and 270b are identically configured, and therefore FIG. 7 illustrates the components of the optical sensor 270a and the components of the optical sensor 270b together. The optical sensors 270a and 270b include spectroscopes 271a and 271b, first light receiving elements 272a and 272b, and second light receiving elements 273a and 273b, respectively. The spectroscopes 271a and 271b separate incident light L0 into light L1 in the above-described first wavelength range (the wavelength region including 750 nm and 870 nm) and light L2 in the above-described second wavelength range (the wavelength region including 1200 nm and 1550 nm). The first light receiving elements 272a and 272b have predetermined or higher sensitivity in the first wavelength range, and are disposed so as to receive the light L1. The predetermined or higher sensitivity here is sensitivity sufficient for the determination by the determination part 82, and will also be referred to as effective sensitivity. The second light receiving elements 273a and 273b have predetermined or higher sensitivity in the second wavelength range, and are disposed so as to receive the light L2. Therefore, for example, when the first light 231b ($\lambda P=750$ nm) or the second light 241b ($\lambda P=870$ nm) is incident on the spectroscope 271a, the first light 231b or the second light 241b is detected by the first light receiving element 272a. Similarly, when the third light 251b ($\lambda P=1200$ nm) or the fourth light 261b ($\lambda P=1550$ nm) is incident on the spectroscope 271a, the third light 251b or the fourth light 261b is detected by the second light receiving element 273a.

The first light source 230a, the second light source 240a, the third light source 250a, the fourth light source 260a, and the optical sensor 270a are disposed on the front side, and the first light source 230b, the second light source 240b, the third light source 250b, the fourth light source 260b, and the optical sensor 270b are disposed on the rear side. The optical sensor 270a on the front side can detect the first light 231a emitted from the first light source 230a on the front side and reflected by the target 90, the second light 241a emitted from the second light source 240a and reflected by the target 90, the third light 251a emitted from the third light source 250a and reflected by the target 90, the fourth light 261a emitted from the fourth light source 260a and reflected by the target 90, the first light 231b emitted from the first light source 230b on the rear side and transmitted through the target 90, the second light 241b emitted from the second light source 240b on the rear side and transmitted through the target 90, the third light 251b emitted from the third light source 250b on the rear side and transmitted through the target 90, and the fourth light 261b emitted from the fourth light source 260b on the rear side and transmitted through the target 90. The optical sensor 270b on the rear side can detect the first light 231a emitted from the first light source 230a on the front side and transmitted through the target 90, the second light 241a emitted from the second light source 240a and transmitted through the target 90, the third light 251a emitted from the third light source 250a and transmitted through the target 90, the fourth light 261a emitted from the fourth light source 260a and transmitted through the target 90, the first light 231b emitted from the first light source 230b on the rear side and reflected by the target 90, the second light 241b emitted from the second light source 240b on the rear side and reflected by the target 90, the third light 251b emitted from the third light source 250b on the rear side and reflected by the target 90, and the fourth light 261b emitted from the fourth light source 260b on the rear side and reflected by the target 90.

The optical detection unit 220 configured in this manner is controlled by the controller 280. A light source control part 281 controls the first to fourth light sources according to a predetermined rule. In the present embodiment, the light source control part 281 controls the first to fourth light sources according to one mode selected from a first mode 283 and a second mode 284. The mode is selected by a user via a user interface (not illustrated) provided to the sorter 100.

Figure 8:
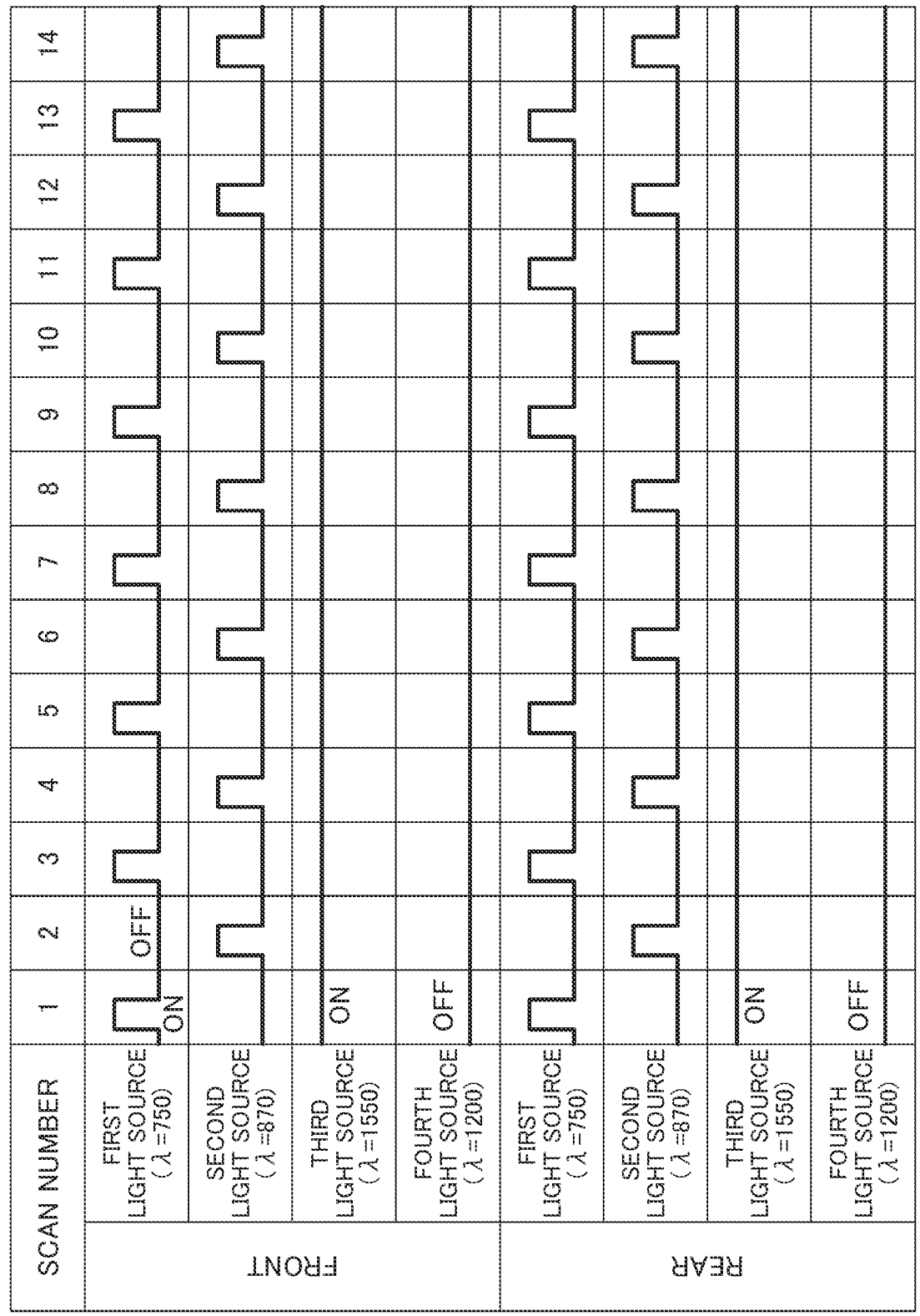
FIG. 8 is a timing chart illustrating the relationship between scan periods of the optical sensors and timings of turning on light sources in a first mode.

FIG. 8 is a timing chart illustrating the relationship between scan periods of the optical sensors 270a and 270b and a timing of turning on each of the light sources in the first mode 283. In the first mode 283, as illustrated in FIG. 8, the first light source 230a on the front side and the first light source 230b on the rear side are on for a predetermined period only during the scan periods having the odd scan numbers, and are off entirely during the scan periods having the even scan numbers. The second light source 240a on the front side and the second light source 240b on the rear side are on for a predetermined period only during the scan periods having the even scan numbers, and are off entirely during the scan periods having the odd scan numbers. The third light source 250a on the front side and the third light source 250b on the rear side are constantly on throughout all the scan periods. The fourth light source 260a on the front side and the fourth light source 260b on the rear side are constantly off throughout all the scan periods.

According to this first mode 283, reflected and transmitted images based on the first light beams 231a and 231b can be acquired during the scan periods having the odd scan numbers and reflected and transmitted images based on the second light beams 241a and 241b can be acquired during the scan periods having the even scan numbers by both the optical sensors 270a and 270b. Further, reflected and transmitted images based on the third light beams 251a and 251b can be acquired during all the scan periods by both the optical sensors 270a and 270b.

According to this first mode 283, by alternately turning on the first light sources 230a and 230b and the second light sources 240a and 240b that emit light beams (the first light beams 231a and 231b and the second light beams 241a and 241b) having two kinds of wavelengths in the effective sensitivity of the first light receiving elements 272a and 272b, the light beams having the two kinds of wavelengths can be detected using one light receiving element, i.e., each of the first light receiving elements 272a and 272b. Further, by turning on the third light sources 250a and 250b that emit light beams (the third light beams 251a and 251b) having one kind of wavelength in the effective sensitivity of the second light receiving elements 273a and 273b, the light having this one kind of wavelength can be detected using the second light receiving elements 273a and 273b. In other words, light beams having three kinds of wavelengths can be detected by each of the optical sensors 270a and 270b.

Figure 9:
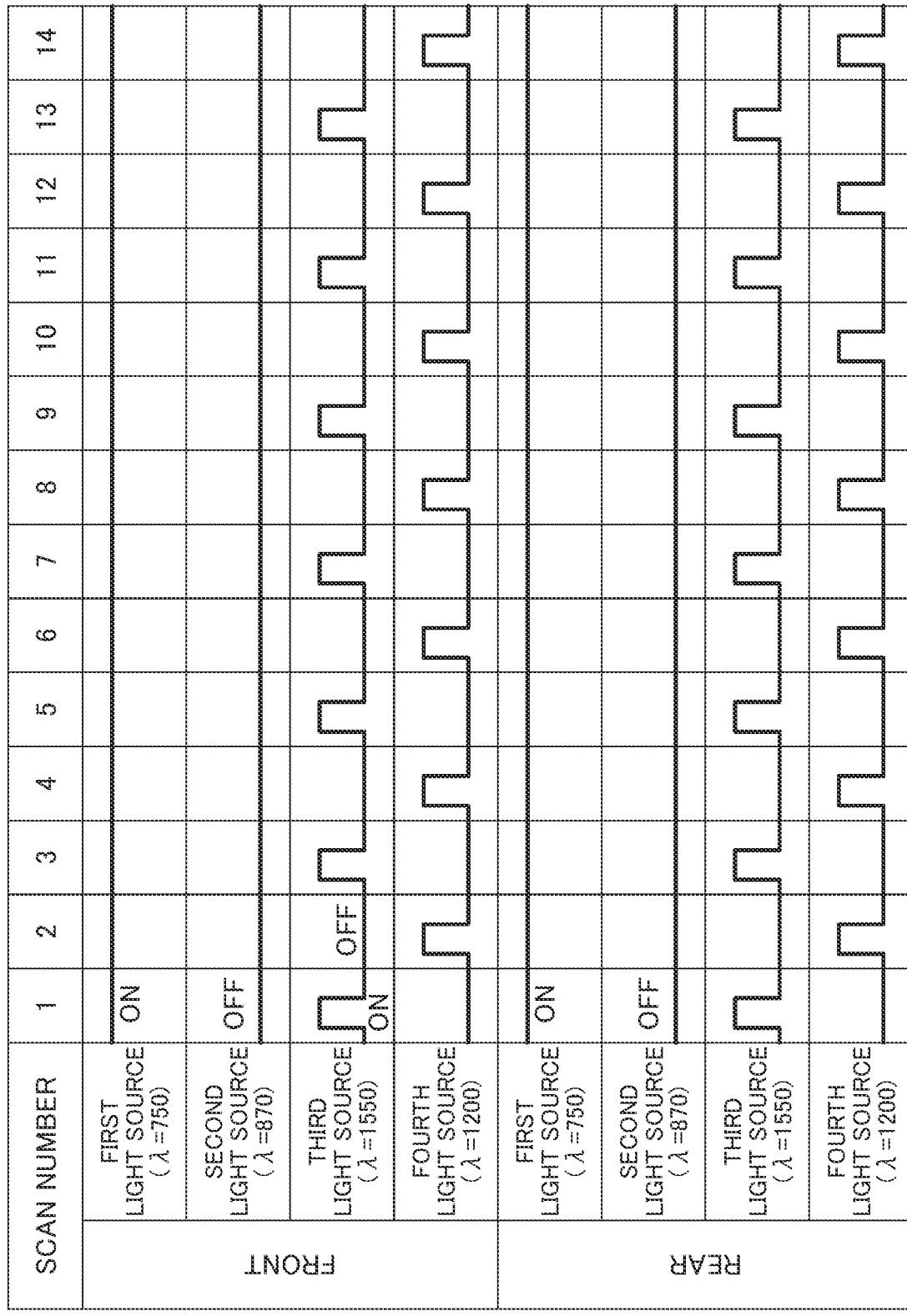
FIG. 9 is a timing chart illustrating the relationship between scan periods of the optical sensors and timings of turning on the light sources in a second mode.

FIG. 9 is a timing chart illustrating the relationship between scan periods of the optical sensors 270a and 270b and a timing of turning on each of the light sources in the second mode 284. In the second mode 284, as illustrated in FIG. 9, the first light sources 230a and 230b are constantly on throughout all the scan periods. The second light sources 240a and 240b are constantly off throughout all the scan periods. The third light sources 250a and 250b are on for a predetermined period only during the scan periods having the odd scan numbers, and are off entirely during the scan periods having the even scan numbers. The fourth light sources 260a and 260b are on for a predetermined period only during the scan periods having the even scan numbers, and are off entirely during the scan periods having the odd scan numbers.

According to this second mode 284, reflected and transmitted images based on the third light beams 251a and 251b can be acquired during the scan periods having the odd scan numbers and reflected and transmitted images based on the fourth light beams 261a and 261b can be acquired during the scan periods having the even scan numbers by both the optical sensors 270a and 270b. Further, reflected and transmitted images based on the second light beams 241a and 241b can be acquired during all the scan periods by both the optical sensors 270a and 270b. According to this second mode 284, light beams having three kinds of wavelengths can also be detected by each of the optical sensors 270a and 270b similarly to the first mode 283.

According to this sorter 200, light beams having three kinds of wavelengths can be detected using one optical sensor, and therefore the cost of the sorter 200 can be reduced. In addition, one of the light beams having the three kinds of wavelengths is continuously emitted, and therefore a sufficient detection intensity can be secured. In addition, the wavelength of the light to be used can be changed, by selecting one of the first mode 283 and the second mode 284, according to the kind of the target 90 or according to the kind of a foreign object and/or a defective product that should be sorted.

The above-described third embodiment can be modified in various manners. For example, the fourth light sources 260a and 260b may be on instead of the third light sources 250a and 250b in the first mode 283. Similarly, the second light sources 240a and 240b may be on instead of the first light sources 230a and 230b in the second mode 284. Further, the third light sources 250a and 250b may be intermittently turned on in such a manner that the lighting period and the non-lighting period thereof are provided in each of the plurality of scan periods in the first mode 283. Even this configuration can also increase the resolutions of the images acquired based on the third light sources 250a and 250b compared to the images acquired based on the other light sources. Similarly, the first light sources 230a and 230b may be intermittently turned on in such a manner that the lighting period and the non-lighting period thereof are provided in each of the plurality of scan periods in the second mode 284. Further, the wavelengths of the light beams emitted from the light sources of the first to fourth wavelengths can be arbitrarily set. Further, the light source control part 281 may control each of the light sources only in one of the first mode 283 and the second mode 284. In this case, the light source that is not turned on (for example, the fourth light sources 260a and 260b in the first mode 283) can be omitted.

Having described several embodiments of the present invention, the above-described embodiments of the invention are intended to facilitate the understanding of the present invention, and are not intended to limit the present invention thereto. The present invention can be modified or improved without departing from the spirit thereof, and includes equivalents thereof. Further, each of the elements described in the claims and the specification can be arbitrarily combined or arbitrarily omitted within a range that allows it to remain capable of achieving at least a part of the above-described objects or bringing about at least a part of the above-described advantageous effects. For example, the above-described light source that is turned on intermittently may be on since the start time of the scan period of the optical sensor that receives the light emitted from this light source. Alternatively, a conveyor may be employed as the means for transporting the target 90 instead of the chute 73.

DESCRIPTION OF NUMERALS 10 optical sorter
20 optical detection unit
30a first light source (red light source)
30b second light source (red light source)
31a first light (red light)
31b second light (red light)
40a third light source (green light source)

40b fourth light source (green light source)
41a third light (green light)
41b fourth light (green light)
50a third light source (blue light source)
50b fourth light source (blue light source)
51a third light (blue light)
51b fourth light (blue light)
60a first optical sensor
60b second optical sensor
71 storage tank
72 feeder
73 chute
74 acceptable product discharge gutter
75 defective product discharge gutter
76 ejector
77 air
80 controller
81 light source control part
82 determination part
90 sorting target
100 optical sorter
120 optical detection unit
130a, 130b first light source (near-infrared light source)
131a, 131b first light (near-infrared light)
140a, 140b second light source (visible light source)
141a, 141b second light (visible light)
150a first optical sensor (near-infrared light optical sensor)
160a, 160b second optical sensor (visible light optical sensor)
180 controller
181 light source control part
200 optical sorter
220 optical detection unit
230a, 230b first light source
231a, 231b first light
240a, 240b second light source
241a, 241b second light
250a, 250b third light source
251a, 251b third light
260a, 260b fourth light source
261a, 261b fourth light
270a, 270b optical sensor
271a, 271b spectroscope
272a, 272b first light receiving element
273a, 273b second light receiving element
280 controller
281 light source control part
283 first mode
284 second mode

The invention claimed is:

1. An optical sorter comprising:
an intermittent light source configured to intermittently emit light toward a plurality of sorting targets in transit;
an optical sensor configured to detect the light associated with one sorting target among the plurality of sorting targets in transit during a plurality of intermittent light scan periods;
a determination part configured to determine a foreign object and/or a defective product with respect to the one sorting target based on a signal acquired by the optical sensor; and
a light source control part configured to control the intermittent light source,
wherein the light source control part is configured to control the intermittent light source in such a manner that, in a case where the intermittent light source is turned on during at least one intermittent light scan period among the plurality of intermittent light scan periods, a lighting period during which the intermittent light source is on and a non-lighting period during which the intermittent light source is off are provided and the lighting period is started at a timing delayed behind a start of the at least one intermittent light scan period in each of the at least one intermittent light scan period.

2. The optical sorter according to claim 1, wherein the light source control part is configured to control the intermittent light source in such a manner that the lighting period is ended at a timing earlier than an end of the at least one intermittent light scan period.

3. The optical sorter according to claim 1, wherein the intermittent light source includes a first intermittent light source disposed on a first side with respect to a transit route of the plurality of sorting targets and configured to emit first light, and a second intermittent light source disposed on a second side opposite from the first side and configured to emit second light having the same wavelength as the first light,
the optical sensor includes a first optical sensor disposed on the first side and a second optical sensor disposed on the second side,
the plurality of intermittent light scan periods includes a first intermittent light scan period and a second intermittent light scan period, and
the light source control part is configured to control the first intermittent light source and the second intermittent light source in such a manner that the first intermittent light source is turned on and the second intermittent light source is off during the first intermittent light scan period, and the first intermittent light source is off and the second intermittent light source is turned on during the second intermittent light scan period.

4. The optical sorter according to claim 3, wherein the first light and the second light are red light.

5. The optical sorter according to claim 3, wherein the intermittent light source includes:
a third intermittent light source disposed on the first side and configured to emit third light having a wavelength different from the first light; and
a fourth intermittent light source disposed on the second side and configured to emit fourth light having the same wavelength as the third light, and
the light source control part is configured to control the third intermittent light source and the fourth intermittent light source in such a manner that the third intermittent light source and the fourth intermittent light source are turned on during both the first intermittent light scan period and the second intermittent light scan period.

6. The optical sorter according to claim 5, wherein each of the third light and the fourth light include green light and blue light.

7. The optical sorter according to claim 1, wherein the intermittent light source emits invisible light having a wavelength in an invisible wavelength region as the light,
the optical sensor is configured as an invisible light optical sensor that detects the invisible light,
the optical sorter further includes:
a visible light source configured to emit visible light having a wavelength in a visible wavelength region toward the plurality of sorting targets in transit; and a visible light optical sensor configured to detect the visible light associated with the one sorting target during a plurality of visible light scan periods, the determination part is configured to determine the foreign object and/or the defective product based on a signal acquired by the invisible light optical sensor and a signal acquired by the visible light optical sensor, and the intermittent light scan period and the visible light scan period are defined based on times having different lengths from each other, respectively.

8. The optical sorter according to claim 7, wherein the intermittent light scan period is set to be N times as long as the visible light scan period, N is an integer equal to or greater than 2.

9. The optical sorter according to claim 7, wherein the invisible light is near-infrared light.

10. The optical sorter according to claim 1,
wherein the optical sensor is a CMOS sensor, and wherein the lighting period is ended at the same time as a start of a readout of charges in the CMOS sensor or is ended at a timing later than the start of the readout and earlier than completion of the readout of the charges.

11. The optical sorter according to claim 1, wherein the intermittent light source includes a first intermittent light source configured to emit first light having a first wavelength in a first wavelength range and a second intermittent light source configured to emit second light having a second wavelength in the first wavelength range that is different from the first wavelength, the optical sorter further includes an additional light source configured to emit third light having a third wavelength in a second wavelength range outside the first wavelength range toward the plurality of sorting targets in transit, the optical sensor integrally includes a first light receiving element having predetermined or higher sensitivity in the first wavelength range, a second light receiving element having predetermined or higher sensitivity in the second wavelength range, and a spectroscope configured to separate incident light into light in the first wavelength range and light in the second wavelength range, the plurality of intermittent light scan periods includes a first intermittent light scan period and a second intermittent light scan period, and the light source control part is configured to control the intermittent light source and the additional light source in such a manner that the first intermittent light source is turned on, the second intermittent light source is off, and the additional light source is a least partially on during the first intermittent light scan period, and the first intermittent light source is off, the second intermittent light source is turned on, and the additional light source is at least partially on during the second intermittent light scan period.

* * * * *